July 13, 1937. J. B. AUSTIN 2,087,225
WELDING APPARATUS
Filed Jan. 25, 1936  2 Sheets-Sheet 1
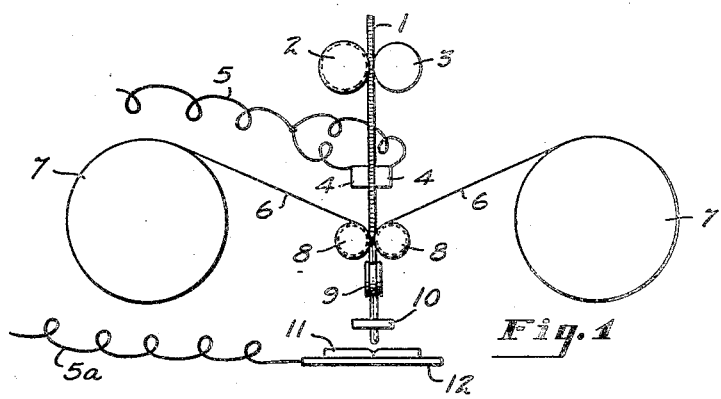
Fig. 1
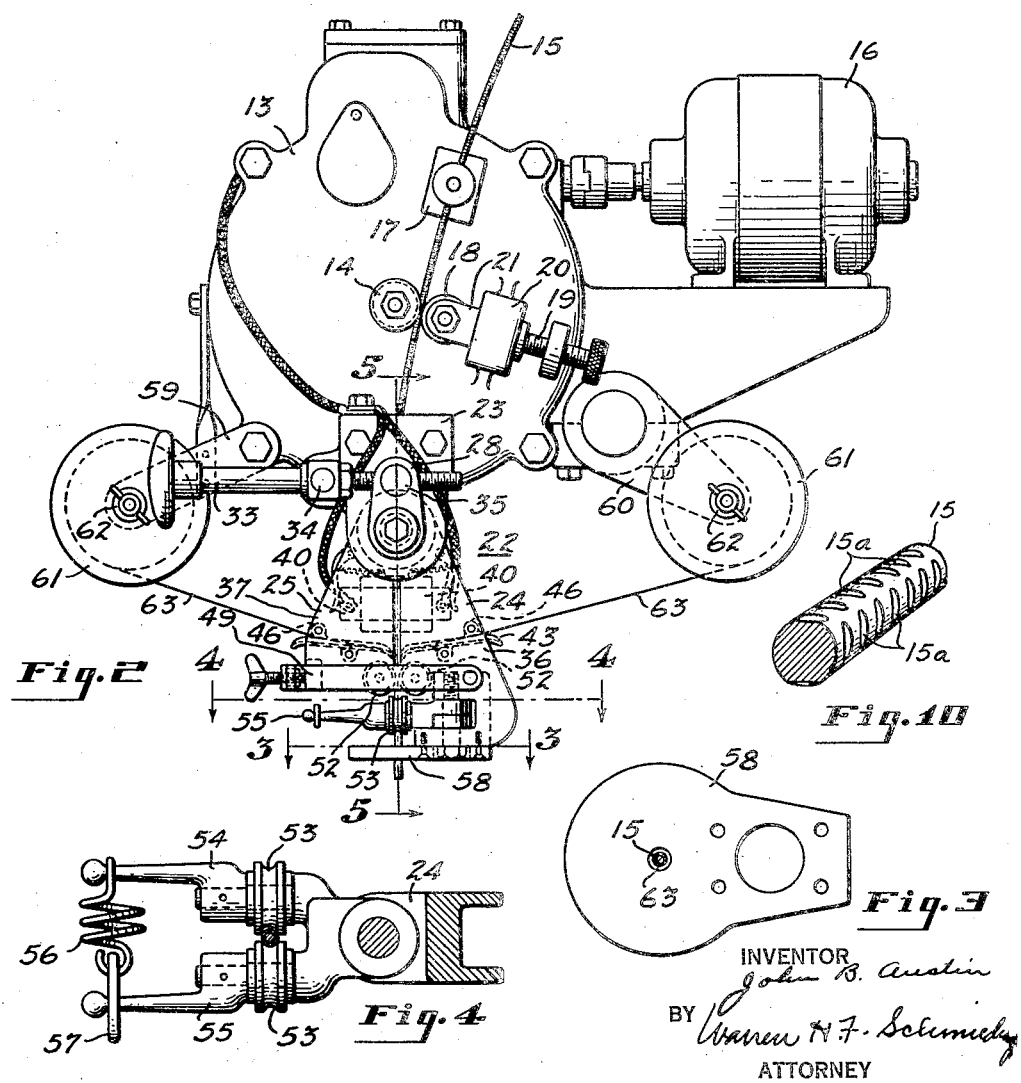
INVENTOR
John B. Austin
BY Warren H. F. Schmidt
ATTORNEY July 13, 1937.  J. B. AUSTIN  2,087,225

WELDING APPARATUS

Filed Jan. 25, 1936  2 Sheets-Sheet 2

INVENTOR
John B. Austin
BY Warren H. F. Schmieding
ATTORNEY

Patented July 13, 1937

2,087,225

UNITED STATES PATENT OFFICE 2,087,225

WELDING APPARATUS

John B. Austin, East Cleveland, Ohio, assignor to Una Welding, Inc., East Cleveland, Ohio, a corporation of Delaware Application January 25, 1936, Serial No. 60,861

41 Claims. (Cl. 219—8)

This invention relates to the arc welding and cutting art, and more particularly to a novel method of and apparatus for electric arc welding or cutting. The present application is a continuation-in-part of my pending application Serial No. 453,620 filed May 19, 1930, for Welding apparatus.

Hitherto in arc welding or cutting, and particularly in automatic arc welding where great lengths of welding wire, as from reels, are fed continuously toward the work in proportion as the wire is melted, it has been necessary that the surface of said wire be electrically conductive in order that electric current might be introduced into the wire at a relatively short distance from the end thereof being melted. It will be understood, of course, that if the electric current were passed through the entire length of reel wire, among the disadvantages that would result would be the undue heating up of the wire which, among other things, would impair, for example, its welding qualities and the quality of the resulting weld metal. Furthermore, if it were attempted to pass the current through long lengths of steel wire, enormous voltages would be required to obtain and maintain an arc, because of the high resistance of steel wire, and the high voltage required merely to force the current therethrough. The resultant heating effect upon the wire can be readily appreciated. Moreover, since the wire is progressively consumed and the length thereof thus constantly varying, the problem of voltage adjustment becomes serious, if indeed it can be solved commercially. The inefficiency in operating under the above conditions is of course apparent. Due to the above conditions no satisfactory method or means has hitherto been proposed for utilizing an electrode in automatic cutting or arc welding wherein the electrode has been provided with an electrically non-conductive coating, it being understood that in certain branches of welding or cutting, such electrically non-conductive coatings are extremely advantageous.

The object of this invention is to provide a method of and apparatus for arc welding or cutting wherein wire may be progressively provided with a coating in proportion as the wire is fed toward the work to be welded or cut. Another object is to provide a method and means for associating coating material with a wire just prior to the melting of said wire in the arc. Another object is to provide a desirable atmosphere about the arc during the welding or cutting operation. Another object is to provide an advantageous method and means for associating slag forming, or fluxing, or flame producing material or material that forms a non-oxidizing atmosphere, or material that forms an oxidizing atmosphere with a wire in proportion as the wire is melted in the arc. Another object is to mechanically associate coating material with wire just prior to the melting of the wire, and in proportion as said wire is melted.

Other objects will be apparent to those skilled in the art from the disclosures herein made and from the accompanying drawings, wherein Figure 1 is a diagrammatic representation illustrating the association of strips of coating material with the welding wire as the welding wire is progressively fed toward the work;

Fig. 2 is a side elevation of means for automatically feeding welding wire to the work, together with means for associating strips of coating material with said welding wire;

Fig. 3 is a plan view of a guard plate taken on line 3—3 of Fig. 2;

Fig. 4 is a horizontal view partly in section taken on line 4—4 of Fig. 2, showing the lower forming rollers;

Fig. 10 is a perspective view, on a larger scale, of a piece of welding wire.

Figure 9:
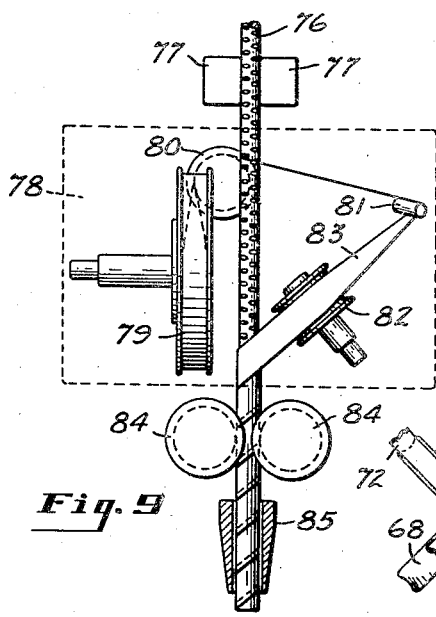
Fig. 9 is a diagrammatic view illustrating a modification of my invention wherein coating material is wrapped around the welding wire in spiral form.
Figure 7:
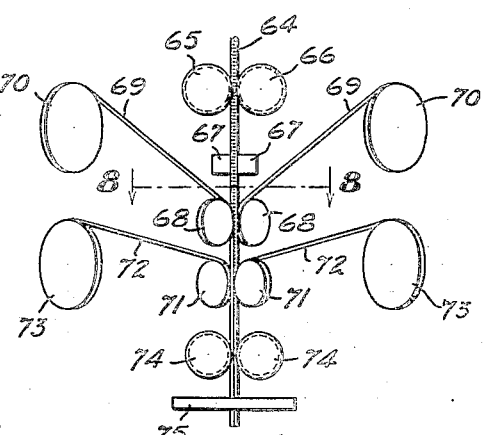
Fig. 7 is a diagrammatic view illustrating a modification of my invention wherein the coating material is applied in four strips.

My invention contemplates briefly associating coating material with a wire progressively as the wire is fed toward the work, and just prior to the melting of the wire. Current may be introduced into the wire just prior to the application of the coating whereby the coating may be of electrically non-conductive material with the consequent advantages of such material in certain types of welding or cutting. My invention is particularly advantageous in applying coating material in strip or tape form, said coating material being caused to remain mechanically in association with said wire until said wire is melted in the arc. Such mechanical association may be accomplished by forming strips of coating material about the wire as illustrated in Figs. 1 and 7, or the coating material may be spirally wound about said wire as illustrated in Fig. 9.

The coating material may be of any suitable composition imparting desirable welding or cutting characteristics, my invention not being limited to any particular composition. For example, I may employ any desirable fabric such as paper, fibre, cloth, pulp, wood, sheet material fabricated from sawdust, thin metal, woven metal, asbestos, and many other materials.

Referring to the drawings, in Fig. 1 I have shown a portion of a wire 1 which may form part of a reel of, for example, welding wire, as commonly known in the welding art, welding wire and arc welding being chosen merely for illustrating one embodiment of the invention. The wire 1 may be of any suitable ferrous or non-ferrous metal, for example, steel, and may be bare or may have fluxing material associated therewith in the form of a core or a coating. Whether coated or bare, the surface of the wire 1 is electrically conductive. The wire 1 is positively fed toward the work in proportion as the end of the wire is melted by the feed roll 2 in a manner well known in automatic welding, with which said roll 2 may cooperate an idler roll 3. After the wire 1 has passed through the rolls 2 and 3, welding current may be introduced thereinto by the brushes 4 connected with a suitable source of welding current through the lead 5. Strips of treated paper or other material 6 are drawn from reels 7 and pass between the upper forming or shaping rolls 8 which serve to form said strips 6 about the electrode. Additional lower forming rolls 9 shown at right angles to the upper forming rolls may be provided to shape said strip material more securely about the wire. The strip coated wire may then pass through an aperture in a guard plate or guide 10 toward the work 11 which is shown as disposed on a plate 12 electrically connected through a lead 5a with the other terminal of a suitable source of welding current, the circuit being completed by the electric arc between the end of the wire 1 and the work 11.

In Figs. 2 to 6 inclusive, I have illustrated in detail mechanism for carrying out the steps outlined in the diagrammatic Fig. 1. For illustration, a welding head 13 of one commercial form is shown, said head having a knurled feed roll 14 arranged to positively feed the welding wire 15 toward the work in proportion as the welding wire 15 is melted, and adapted to retract the wire when necessary, said feed roll 14 being actuated from a suitable source of power such as the reversible motor 16 through mechanism within the head 1 not constituting a part of this invention.

The welding head 13 is shown as having an apertured wire guide 17. Cooperating with the feed roll 14 is an idler roll 18, the pressure of which against the wire between said rolls 14 and 18 may be regulated by a screw 19 cooperating with the lug 20 and acting upon the member 21 carrying the idler roll 18.

Secured to the welding head 13 is the coating applying mechanism 22 which is shown as also carrying the brushes for transmitting welding current to the wire. The mechanism 22 is shown as pivotally mounted so that the wire may be directed at a desired angle to the welding head 13 if so desired. Thus, the bracket 23 is shown as suitably secured to the head 13. Pivotally secured to the bracket 23 are the roller supporting arms 24 and 25. The supporting arm 24 is shown as having an integral stem at the upper end thereof extending through apertures 26 and 27 (Fig. 5) in the upper end of the supporting arm 25 and bracket 23, said stem extending outwardly beyond the bracket 23 and through an aperture in the lever arm 28 and being keyed to said lever arm. The nut 29 and washer 30 secure the members 24, 25, 23 and 28 in cooperative relation.

Figure 5:
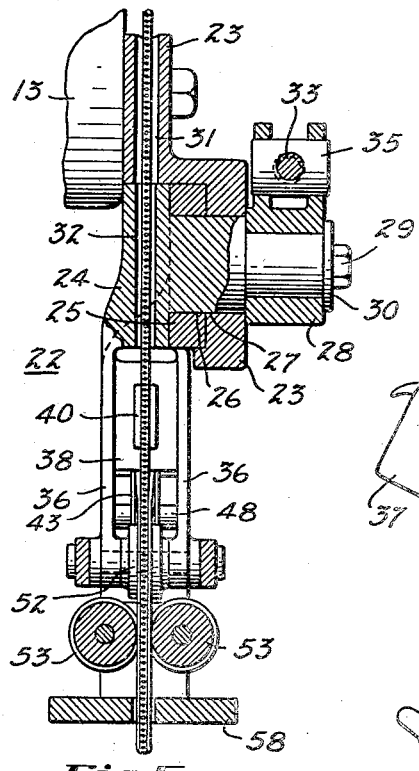
Fig. 5 is a vertical sectional view of the coating applying means taken on line 5—5 of Fig. 2.
Figure 6:
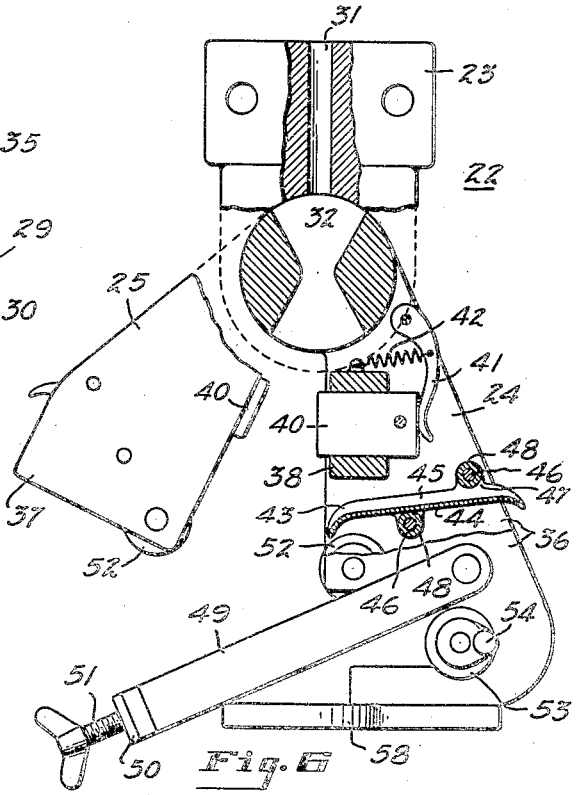
Fig. 6 is an enlarged side elevation of the coating applying mechanism with the roller supporting arms separated and with parts broken away to show the internal construction.

Referring particularly to Figs. 5 and 6, the brackets 23 and arm 24 are provided with the apertures 31 and 32 through which welding wire may pass, the aperture 32 being tapered outwardly at both ends so that welding wire may pass readily therethrough regardless of the angular position of the arm 24 with respect to the bracket 23.

The roller supporting mechanism may be pivotally adjusted to direct the welding wire at a desired angle to the welding head, by the adjusting screw 33 carried by the pivot bearing 34 and cooperating with the pivot nut 35 carried by the torque arm 28.

The roller supporting arms 24 and 25 are shown as having the spaced side walls 36 and 37, respectively. Intermediate said respective side walls 36 and 37 are web portions 38 carrying the electrically insulating bushings 39 which in turn carry the brushes 40. Brush fingers 41 actuated by springs 42 may be employed to cause the brushes 40 to bear with suitable pressure against the welding wire. Below the brushes 40 and intermediate the walls of the supporting arms 24 and 25 are shown the guide chutes 43 having the bottom portions 44 and side portions 45. The guide chutes 43 are carried by pins 46 extending between the walls of the respective arms 24 and 25 and through apertures in the extensions 47 of the side portions 45. Spacers or collars 48 around the pins 46 locate the chutes 43 in desired position between the side walls 36 and 37.

Pivotally secured to the arm 24 is a substantially U-shaped clamp 49, the cross piece 50 of which is arranged to extend outwardly of the outer side arm 25. Said cross piece 50 may, if desired, be of spring steel to obtain a desired tension of the arms 24 and 25 toward each other. The clamp screw 51 is arranged to extend through the cross piece 50 and cooperate with the outer face of the arm 25 to hold the arms 24 and 25 in cooperative relation.

Directly below the guide chutes 43 are shown the upper shaping or forming rollers 52 which are suitably journaled in the side walls of the arms 24 and 25. The radial faces of said forming rolls 52 are concavely or otherwise suitably shaped to cooperate with the surface of the welding wire. The pressure exerted by the forming rolls 52 against the wire and the coating thereon may be regulated by adjusting the clamp screw 49.

Directly below the forming rolls 52 are the lower forming rolls 53 disposed at substantially right angles to the upper forming rolls. The forming rolls 53 are carried by the scissor arms 54 and 55 journaled in the supporting arm 24. The outer extremities of the scissor arms 54 are shown as spherically shaped, the spring 56 being secured to the scissor arms 54 and 55, a latch plate 57 being arranged to extend over the spherical knob of the scissor arm 55 to cause the forming rolls 53 to press against the welding wire and coating with the desired pressure. A guard plate 58 is shown as secured to the arm 24 below the lower forming rolls 53, said guard plate having an aperture therein through which the welding wire may pass. The guard plate 58 serves to guide the welding wire and protect the intermediate parts of the mechanism 22 from the heat of the arc and from spattered metal particles.

Brackets 59 and 60 are shown as secured to the welding head 13, each bracket in turn carrying a reel 61 upon which may be disposed the paper or other elongated material 63 which is to form the coating. The rotation of the reels 61 may be frictionally retarded to the desired degree by the nuts 62 or by other suitable means so that the paper or other coating material may be removed from the reels at the desired rate.

It will be understood, of course, that in certain cases it may not be desirable or necessary to have the coating applying mechanism pivotally mounted with respect to the welding head 13. In such case the arm 24 may be secured directly and in rigid relation to the bracket 23 or to the welding head 13, the arm 25 then being pivotally movable with respect to the arm 24 whereby the arms may be separated.

In operation, referring to the mechanism shown in Figs. 2 to 6, inclusive, the welding wire 15 extends as from a coil of reeled wire through the apertured guide member 17 intermediate the feed roll 14 and idler roll 18, then passes down through the apertures 31 and 32 in the bracket 23 and arm 24, respectively, and thence between the brushes 40 past the guide chutes 43, intermediate the forming rolls 52 and 53, and through the guide plate 58. The welding wire 15 is positively fed to the work in proportion as the wire is melted, by the knurled feed roll 14, whereby the welding wire is actuated through the mechanism described. The strips 63 from the reels 61 pass under the pins 46 along the chutes 43 and thence downward along with the welding wire, said strips being subsequently mechanically shaped around the wire by the forming rolls 52 and 53, said shaping being ordinarily sufficient to maintain the strips in cooperative relation with the wire until the wire is melted a short distance below the guard plate 58, the progressive combustion of the strips as the wire melts serving to provide a reducing atmosphere about the arc to protect the molten weld metal from oxidation.

It has been found that excellent results have been obtained when part or parts of the material or materials desirable for welding or cutting is or are carried directly by the wire and part carried by the strips or tape 6. In carrying this out I desire to employ a wire having a roughened surface and preferably I employ a dented wire, more clearly shown in Fig. 10, in which the dents are shown at 15a. Fluxing material or any ingredient desirable for the weld or desirable for cutting may be placed in the dents and the extreme outer surface or surfaces of the wire are bare for obtaining good electrical contact with the brushes 40. The strips may be coated with any desired ingredient or ingredients, or the strips can be impregnated with the desired ingredient or ingredients. I have found that excellent results are obtained when the desired ingredients are impregnated in cloth strips. By placing a welding ingredient or ingredients on or in both the wire and strips, the amount carried by each is reduced and therefore are less liable to flake off. In this manner, in actual practice, the flux or other welding or cutting ingredient is, or are, applied more uniformly at the arc and this in effect provides a more stable arc and a uniform weld.

The roughened or dented wire also materially aids in feeding the strips or tape with the wire. The surface or surfaces of the rod, due to the dents, are roughened, and, due to the fact that the strips or tape are pressed against the wire by the rollers 52 and 53, the rough edges of the wire will be embedded in the ingredient carrying strips or tape and parts of the strips will be pressed into the dents. In this manner, the strips or tape will adhere to the wire to such extent that they will be moved concomitantly with the movement of the wire, whether the wire is being moved downwardly or is being retracted.

Figure 8:
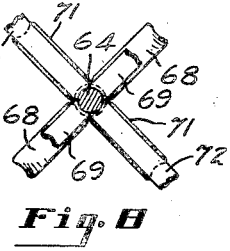
Fig. 8 is a vertical sectional view taken on line 8—8 of Fig. 7 showing the pairs of forming rollers disposed at 90 degrees about the welding wire.

In Figs. 7 and 8 I have illustrated a modification of my invention wherein four strips of coating material are utilized in forming a coating or shield about the wire. Thus, the wire 64 passes through the feed rolls 65 and 66 and downwardly between the brushes 67, then between the oppositely disposed forming rolls 68 which shape the paper 69 from the oppositely disposed reels 70 about the wire 64. Thence the wire passes between the oppositely disposed forming rolls 71 which are arranged at ninety degrees to the upper forming rolls 68. The lower forming rolls serve to shape the paper 72 from the reels 73 about the wire 64. The wire subsequently passes intermediate the lower rolls 74 which serve to guide the wire and additionally to assist in holding the strips in desired position about the wire. The wire is then shown as passing through the guard plate 75.

It will be understood that the form of invention wherein strip material is disposed longitudinally about the wire is not limited to any particular number of coating strips. Thus, instead of the two strips as shown in Fig. 1, or the four strips as shown in Fig. 7, other numbers of strips might be employed, depending upon the particular conditions at hand.

In Fig. 9 I have illustrated another modification of my invention wherein the strip material is wound about the wire 76, for example, in spiral form. The winding of the wire 76 may, of course, be accomplished either by rotating the wire within the coating material or by moving the coating material about a non-rotating wire or, of course, a combination of these methods might be employed. Referring particularly to Fig. 9, I have shown a pair of brushes 77 arranged to contact electrically with the wire 76 to conduct welding or cutting current thereto, said wire being fed downwardly by suitable means (not shown). Within the housing 78 I have shown a reel 79 arranged to carry a coil of strip coating material and suitable pulleys 80, 81 and 82. The reel 79 may be actuated by suitable mechanism (not shown).

The housing 78 and the mechanism therein may be rotated about the wire 76 at a speed dependent upon the feeding of the wire therethrough so that the coating may be progressively applied to the wire. Below the housing I have shown a pair of guide rolls 84, and below the rolls I have shown a nozzle 85 which serves to guide the wire toward the work. In operation, the wire as stated is fed downwardly between the brushes 77 through the housing 78 and intermediate the rolls 84 and through the nozzle 85. As the wire passes through the housing 78 the coating material 83 is progressively wound therearound, the rolls 84 serving to guide the wire and additionally to press the coating material more securely around the wire. The strip of coating material may be arranged to be lap-wound around the wire, as indicated in Fig. 9, or may be butt-wound, as desired. Ordinarily I prefer to rotate the housing around the wire 76, but under certain special conditions, it might be desirable to rotate the wire within a stationary housing in order to apply the coating thereto.

I have found paper or cotton cloth tape to be a very satisfactory material to employ in carrying out this invention. I have found also that it is desirable to use relatively tightly woven or fine mesh strip material when a relatively small amount of welding or cutting ingredient only is necessary and, when a large amount of such ingredient is necessary, strip material of looser woven material or larger mesh is selected. The quality, thickness and width of the strips employed may be determined for the particular conditions at hand. In some instances it may be desirable to completely surround the wire and in other instances, partial surrounding of the wire will suffice. My invention may be carried out by the use of other coating materials than paper or cloth tape. For example, any of the aforementioned materials may be employed in carrying out my invention. Under certain circumstances, it might be desirable to employ thin metallic strips, or interwoven or intermeshed wire cloth, or asbestos tape as a coating material, for example, where it is desired to use a tape which is free of carbonaceous material. In such cases, such metallic strip or wire cloth might be in amount sufficient merely to provide the desired alloying effect without attempting to cover the entire outer surface of the welding wire. Such tape, of course, can carry ingredients desirable for welding or cutting. While in certain cases it may be desirable to use an adhesive coating on the surface of the materials, in general I contemplate that an adhesive will be unnecessary, the shaping of the paper or other coating material or alternatively the winding of the coating material about the wire being sufficient to maintain the coating material in cooperative relation with the wire until the wire is melted in the arc. This particularly occurs when the strip or tape is coated and/or impregnated with desirable welding or cutting ingredients, and, still more so when a dented wire is employed.

A suitable coating which can be applied to either the wire entirely or the tape entirely or applied part to the wire and part to the tape for welding purpose, includes: silica, asbestos, sodium carbonate, sodium silicate, red iron oxide, ferro-manganese, sage leaf powder, sodium titanate, titanium dioxide, and sufficient water to form a paste for coating the wire or tape. It of course will be understood that it may be desirable to increase the water content for impregnating the cloth or other fabric. Another coating which proved satisfactory was titanium dioxide, sodium carbonate, powdered sage, red iron oxide, asbestos, china clay, ferro-manganese, ilmenite, beryl, silica, manganese dioxide, sodium silicate and the necessary water.

From the foregoing it will be readily apparent that in the use of my invention, coatings of any desired characteristic can be applied to the wire by the tape; for welding purposes, all or part, of ingredients which produce a reducing gas or atmosphere about the arc, of flux and slag forming ingredients, can be applied to or embedded in the tape; the slag forming ingredient may be of the type which produces reducing gas or atmosphere about the arc. For cutting purposes any of the ingredients having the above characteristics may be used if desirable, or, any other desirable ingredient may be applied to or embedded in the tape, for example, for cutting purposes, it may be desirable to substitute an ingredient such as an oxalate, which will produce a strongly oxidizing atmosphere about the arc.

It will be understood, of course, that if the base material of the tape such as paper or cotton cloth, or, if the ingredient added to either the wire or tape is such that it burns freely, other suitable ingredients having combustion retarding characteristics, such as sodium silicate, silica, etc., will be included so that the coating does not burn faster than the wire and preferably where used for welding, the coating should burn slower than the wire so that the burning end is cupped.

By my invention it will be understood that the desired coating may be applied to the wire immediately prior to the welding or cutting operation, and in proportion as the wire is melted in the electric arc. In other words, it may be said that by my invention the coating is applied "in situ". Furthermore, in view of the fact that the wire is melted directly after the coating operation, it will be noted that the coating need be associated with the wire only sufficiently firmly for the immediate melting of the wire, thus obviating the necessity for providing coatings capable of withstanding transportation and considerable abuse in handling.

Although adhesives may be used if desired, it will be noted that adhesives need not be employed in carrying out my invention.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

I claim:

1. The method of electric arc welding, which comprises feeding welding wire toward the work, causing electric current to pass through the portion of the wire adjacent the end thereof being melted, and mechanically binding paper about the end portion of the wire through which current is passed, whereby to coat said wire in proportion as the wire is melted.

2. The method of electric arc welding, which comprises progressively feeding welding wire toward the work being welded and disposing on said wire a fabric coating in proportion as the wire is consumed, and mechanically securing said coating to said wire.

3. The method of electric arc welding, which comprises automatically feeding welding wire toward the work to be welded, continuously associating fabric strip material about said wire adjacent the welding end thereof, and mechanically holding said material in associated position with said wire until said wire is directly adjacent the welding arc.

4. The method of electric arc welding, which comprises continuously feeding welding wire toward the work being welded, transmitting electric current to the surface of said wire relatively close to the end of said wire, and subsequently disposing on said wire strip material longitudinally of the wire and in proportion as the wire is consumed.

5. The method of electric arc welding, which comprises feeding welding wire having an electrically conductive surface toward the work to be welded, transmitting electric current to the surface of said wire and subsequently mechanically shaping paper about said wire to cause said paper to remain in association with said wire for a limited period of time, and subsequently melting said wire in an electric arc, whereby said paper upon combustion from the heat of the arc will produce a non-oxidizing atmosphere about the molten weld metal.

6. The method of electric arc welding, which comprises feeding a welding wire having an electrically conductive surface toward the work, contacting a source of welding current to the surface of said wire and associating a fabric covering with said wire subsequent to said contacting, and prior to the introduction of said wire into the electric arc.

7. The method of electric arc welding, which comprises continuously feeding welding wire toward the work to be welded, and disposing a paper shield about said wire just prior to the entry of the wire into the arc, whereby to provide a non-oxidizing atmosphere about the metal being welded in the arc.

8. The method of electric arc welding, which comprises automatically feeding welding wire toward the work to be welded in proportion as the end of said wire is melted, and automatically coating the end of said wire with a fabric prior to the melting of said wire in the arc.

9. The method of electric arc welding, which comprises automatically feeding welding wire toward the work and surrounding the end portion of the wire with a dry paper shield just prior to the melting of said wire, and causing said shield to remain associated with the wire until said wire is melted in the arc.

10. The method of electric arc welding, which comprises automatically feeding welding wire toward the work and automatically wrapping strip paper around the end of the wire just prior to the melting of said wire in the arc.

11. The method of electric arc welding, which comprises continuously feeding welding wire toward the arc and wrapping a fabric coating around the end of the wire about to be melted in the arc.

12. Electric arc welding apparatus comprising, in combination, means for feeding welding wire continuously toward a welding arc, a brush arranged to contact with said welding wire to transmit electric current thereto, and means for associating fabric strip material relatively closely about said welding wire just prior to the melting of the wire in the arc.

13. Electric arc welding apparatus comprising, in combination, a welding head arranged to positively feed welding wire toward the work, in proportion as the wire is melted, means for carrying a supply of elongate material to be associated with said wire, means for forming said elongate material about said wire as said wire is progressively moved toward the arc, and means for maintaining said elongate material associated with said wire to the end thereof.

14. Electric arc welding apparatus comprising, in combination, means for positively feeding welding wire toward the work in proportion as the wire is melted, a plurality of reels for carrying strip material to be associated with said welding wire, means for guiding said strip material toward the progressively moving wire, and means for crimping said strip material about said wire as said wire is progressively moved.

15. Electric arc welding apparatus comprising, in combination, a welding head arranged to positively feed wire toward the work in proportion as the wire is melted, a plurality of reels arranged to carry strip material, a pair of separable supporting arms carried by said welding head, said supporting arms being arranged to encompass the progressively moving welding wire, means carried by said supporting arms for guiding said strip material toward the welding wire, a plurality of rolls carried by supporting arms arranged to crimp said material about said wire, and means for adjusting the pressure of said rolls about said strip material and welding wire, and an apertured guard plate through which the coated welding wire may pass subsequent to passing through said rolls.

16. Electric arc welding apparatus comprising, in combination, a welding head arranged to feed welding wire toward the work in proportion as the wire is melted, a plurality of rolls arranged to carry strip material, a pair of separable supporting arms carried by said welding head, said supporting arms being arranged to encompass the progressively moving welding wire, means carried by said supporting arms for guiding said strip material toward the welding wire, a pair of rolls carried by said supporting arms and arranged to engage said strip material and welding wire from opposite sides of the welding wire whereby to form said strip material about said wire, means for adjusting the pressure of said rolls upon said welding wire, a second pair of rolls carried by said supporting arms carried by one of said supporting arms and arranged to engage said strip material and welding wire, said second pair of rolls being disposed at 90 degrees to said first pair of rolls, and means for adjusting the pressure of said second pair of rolls upon said welding wire.

17. Electric arc welding apparatus comprising, in combination, a welding head arranged to positively feed wire toward the work in proportion as the wire is melted, a plurality of rolls arranged to carry strip material, a pair of separable supporting arms carried by said welding head, said supporting arms being arranged to encompass the progressively moving welding wire, brushes carried by said supporting arms arranged to contact with the wire progressively moving therethrough, means carried by said supporting arms for guiding said strip material toward the welding wire, a plurality of rolls carried by said supporting arms arranged to crimp said strip material about said wire, and means for adjusting the pressure of said rolls about said strip material and welding wire, and an apertured guard plate through which the coated welding wire may pass subsequent to passing through said rolls.

18. Electric arc welding apparatus comprising, in combination, a welding head arranged to positively feed welding wire toward the work in proportion as the wire is melted, a pair of pivotally mounted supporting arms carried by said head, means for pivotally adjusting said supporting arms with respect to said head, means for carrying a supply of strip coating material, means carried by said supporting arms for guiding said strip material toward said progressively moving welding wire, and rolls carried by said supporting arms arranged to crimp said coating material about said welding wire.

19. In arc welding apparatus, an arc welding head comprising brushes adapted to contact with an electrode for introducing current thereto, a nozzle below said brushes for guiding the electrode during the feeding thereof toward the arc, means providing a source of supply of strip material conducive to the formation of the weld, and means on said guide for introducing said strip material to the electrode at a point below said brushes and in the direction of travel of said electrode and causing said material to travel with the electrode toward the arc.

20. In arc welding apparatus, guiding means for a welding electrode, means providing a source of supply of strip material conducive to the formation of the weld, and means comprising rollers on said guiding means for pressing material from said source against said electrode and causing withdrawal of said material from said source by said electrode during the travel of the latter.

21. In arc welding apparatus, an arc welding head comprising brushes adapted to contact with an electrode for introducing current thereto, a nozzle below said brushes for guiding the electrode during the feeding thereof toward the arc, means providing a source of supply of strip material conducive to the formation of the weld, and roller means on said guide for pressing said strip material against said electrode whereby during the travel of said electrode the latter withdraws strip material from said source.

22. The method of electric arc welding, which comprises feeding welding wire toward the work, causing electric current to pass through the portion of the wire adjacent the end thereof being melted, associating strips of paper about the wire in the direction of travel of the wire, and mechanically forming and pressing the paper strips around the portion of the wire through which current is passed to coat said wire in proportion as the wire is melted.

23. The method of electric arc welding, which comprises feeding welding wire toward the work, causing electric current to pass through the portion of the wire adjacent the end thereof being melted, continuously covering said wire with strips of paper in the direction of travel of the wire as the wire is fed, and mechanically holding said strips in associated position with said wire until said wire is directly adjacent the welding arc.

24. The method of electric arc welding, which comprises feeding welding wire toward the work, causing electric current to pass through the portion of the wire adjacent the end thereof being melted, causing strips of paper to be fed in the direction of travel of the wire by movement of the wire toward the work, and mechanically pressing and holding the strips around the portion of the wire through which current is passed to coat said wire in proportion as the wire is melted.

25. A method of arc welding comprising feeding welding electrode material to the arc, and disposing a carbohydrate-containing strip lengthwise of and about said electrode just prior to the entry of the wire into the arc.

26. In a method of arc welding, the steps of feeding electrode material to the arc, applying electric current to a point in the length of the electrode, and applying strips of covering material to the electrode intermediate the arc and the electrical contact point, said strips being applied in the direction of feeding of the electrode.

27. In a method of arc welding, the steps of feeding electrode material to the arc, supplying electric current to a point in the length of the electrode, applying strip material to the electrode, and conforming the strip by transverse deformation thereof, to the shape of the electrode.

28. The method of automatic electric arc welding which consists in feeding a continuous length of electrode wire to an arc struck between the wire and the material to be welded, supplying electric current to the wire at a point removed from the arc, feeding flux in the form of flat tape to the wire and parallel therealong at a point between the arc and the point of supplying current to the electrode wire, and deforming the flux tape about said electrode wire to substantially completely enclose the latter.

29. In a device for electric arc welding which utilizes as one electrode a length of electrode metal in the form of a wire to be fed into the arc struck between the electrode metal and the material to be welded, means for feeding said wire into said arc, means contacting said wire to supply electric current thereto, means for feeding a flux in the form of a flat tape to said wire and parallel therealong, and means for laterally deforming said tape about said wire.

30. In a device for electric arc welding which utilizes as one electrode a length of electrode metal in the form of a wire to be fed into the arc struck between the electrode metal and the material to be welded, means for feeding said wire into said arc, means contacting said wire to supply current thereto, means for feeding flux in the form of flat tape to said wire and parallel therealong, means for folding the edges of said tape back about said wire to form a trough containing said wire and additional means positioned between said first folding means and said arc for compressing said folded tape against said wire to substantially completely enclose the latter.

31. In a welding rod forming and feeding machine, the combination of means for feeding a welding rod, means for holding a supply of a continuous strip of flux carrying flame producing agent, and means for holding a portion of said agent frictionally in contact with the rod in a linear direction whereby the said agent will be advanced lengthwise with and by the rod as the latter is fed, to produce a welding element, said element being supplied to the work directly it is formed.

32. In a welding rod forming and feeding machine, the combination of means for feeding the rod, means for holding a supply of flux carrying flame producing agent in the form of a strip, a guide for directing one end of the strip against and lengthwise along the periphery of the rod, means for holding the strip frictionally in contact with the rod whereby the said agent will be advanced by the rod as the latter is fed into the welding zone.

33. In a welding rod forming and feeding machine, the combination of means for feeding the rod, means for holding a plurality of supplies of flux carrying flame producing agents in the form of strips, means for guiding one end of said strips in contact with different portions of the periphery of the rod, means for holding the strips frictionally in contact with the rod, whereby the said agents will be advanced by and with the rod as the latter is fed into the welding zone.

34. In a welding rod forming and feeding machine, the combination of means for feeding the rod, means for bringing a plurality of strips of flexible material against the surface of the rod and for holding the strips in contact with the rod whereby the tractive effort between the strips and the rod will cause the strips to be advanced solely by the rod as the latter is fed, said strips being disposed on opposite sides of the rod whereby the flame will encompass and protect the arc at the point of welding.

35. In a welding rod forming and feeding machine, the combination of means for feeding a welding rod, and means including a roller co-operating with said rod to position and feed a strip of flame producing element against and along the periphery of the rod as the rod is advanced to provide a welding element, said element being supplied to the work directly as it is formed.

36. The method of electric arc welding which comprises feeding a flux carrying wire toward the work; causing electric current to pass through the wire adjacent the end thereof being melted; supplying flux carrying linear material to the arc with the wire by causing the material to be fed with the wire due to the frictional engagement between the wire and material.

37. The method of electric arc welding which comprises feeding a wire toward the work; causing electric current to pass through the wire adjacent the end thereof being melted; supplying suitable linear material to the arc longitudinally of the wire by causing the material to be fed with the wire due to the frictional engagement between the wire and material.

38. The method of electric arc welding which comprises feeding a rough surface wire to the work; causing electric current to pass through the wire adjacent the end thereof being melted; supplying suitable linear material to the arc with the wire by causing the material to be compressed into the rough surface of the wire and to be fed with the wire.

39. The method of electric arc welding which comprises feeding a rough surface wire to the work; causing electric current to pass through the wire adjacent the end thereof being melted; supplying suitable linear material to the arc longitudinally of the wire by causing the material to be compressed into the rough surface of the wire and to be fed longitudinally with the wire.

40. In combination with a rough surface wire and material to be applied longitudinally to the wire, means for feeding and retracting said wire in relation to the work to be welded, means arranged to contact with said wire to transmit electrical current thereto, and means for causing said material to be held in frictional contact with the rough surface of the wire and fed longitudinally with the wire for feeding and for retracting the material longitudinally and concomitantly with the wire.

41. The method of electric arc welding which comprises feeding a flux carrying wire toward the work; causing electric current to pass through the wire adjacent the end thereof being melted; supplying flux carrying linear material to the arc longitudinally of the wire by causing the material to be fed with the wire due to the frictional engagement between the flux carrying wire and material.

JOHN B. AUSTIN.